July 10, 1951     W. G. BRATZ     2,559,755
FENDER EXTENSION
Filed March 8, 1950
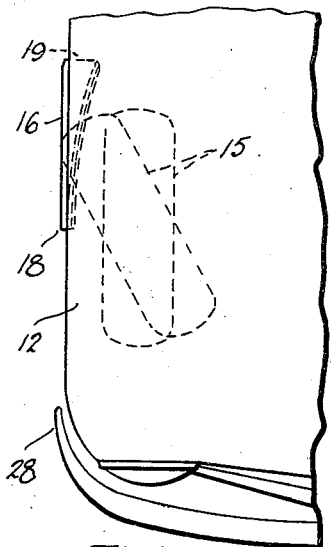
Fig.1.
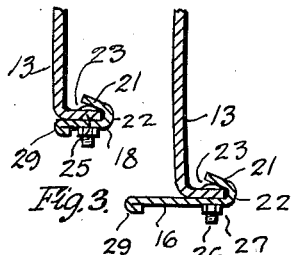
Fig.3.
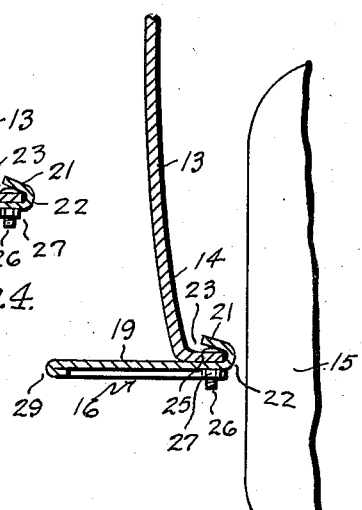
Fig.4.
Fig.5.
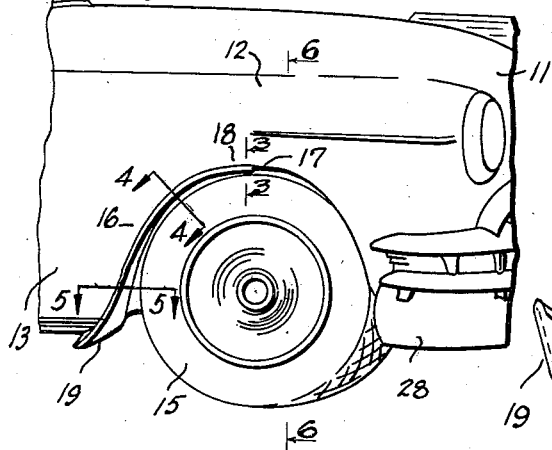
Fig.2.
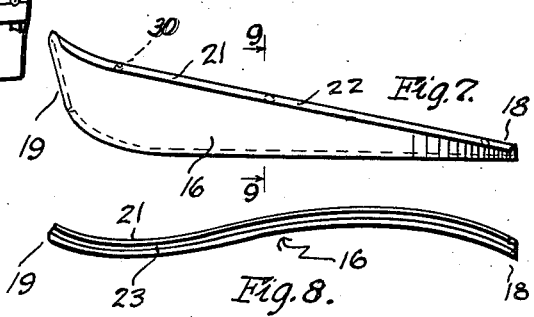
Fig.7.
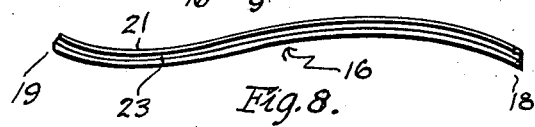
Fig.8.
Fig.9.
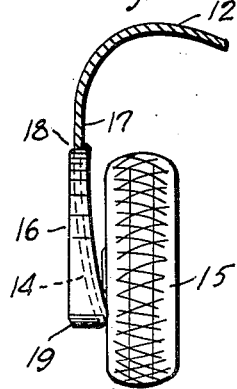
Fig.6.
Inventor
William G. Bratz
Wooster & Davis   Attorneys Patented July 10, 1951

2,559,755

UNITED STATES PATENT OFFICE 2,559,755

FENDER EXTENSION

William G. Bratz, Easton, Conn.

Application March 8, 1950, Serial No. 148,305

6 Claims. (Cl. 280—152)

This invention relates to a device for protecting the skirts of motor vehicle fenders against marring and soiling by stones and mud splashed or thrown by the adjacent vehicle wheel. In current motor vehicle body design, the fenders usually have extended skirts, the lower portions of which reach downwardly to a relatively low point not far above the road surface and are molded into and form a part of the side panels of the body proper. For design purposes and also to avoid marring the front fender skirt by contact with high curbs and similar objects, the lower portion of the fender skirt is frequently inclined or curved, or otherwise displaced inwardly so as not to be struck by such objects. However, as a result of this inward shaping of the fender skirt, road dirt and muddy water are thrown or splashed against the outside of the automobile, especially when the front wheel is cramped in turning as in going around corners or curves it throws dirt and road spray against the outer fender surface and along the side of the vehicle body, soiling and marring their polished finish.

An object of this invention is to provide an improved fender guard constructed and arranged to protect the fender and body surfaces against splashing and the like by the vehicle wheel.

A further object is to provide an improved fender guard which can be easily attached to the edge of a fender adjacent the vehicle wheel without in any way affecting the operation of the latter.

A further object is to provide a fender guard for the purpose described constructed and arranged to constitute an ornamental feature on the vehicle.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a top plan view of a fender guard constructed in accordance with one embodiment of the invention, showing it in place on the front fender of a motor vehicle;

Fig. 2 is a side view of the guard and fender shown in Fig. 1;

Figs. 3, 4 and 5 are sections on the lines 3—3, 4—4 and 5—5 of Fig. 2;

Fig. 6 is a section on the line 6—6 of Fig. 2;

Figs. 7 and 8 are front and edge views, respectively of the guard shown in Figs. 1 and 2, and Fig. 9 is a section on the line 9—9 of Fig. 7.

For the purposes of illustration, the invention is shown in connection with a motor vehicle 11 having a front fender 12 provided with a skirt 13. As shown in Figs. 5 and 6, the lower portion 14 of the skirt 13, is inclined, curved or otherwise displaced inwardly to lessen the hazard of striking objects such as curbs or the like, and for design appearance. As indicated by broken lines in Fig. 1, this lower portion 14 is necessarily so positioned with relation to the front vehicle wheel 15 as to be apt to be soiled and marred by stones and mud thrown onto its surface by the adjacent wheel, especially when the latter is cramped in steering.

To prevent this damage, the present invention provides a fender guard having, as illustrated, a body portion 16 which is curved to conform with the curved front edge 17 of the fender skirt 13 adjacent the wheel 15, which is the rear edge of the front wheel opening and is at the upper rear side of the front wheel 15. The body portion 16 tapers from a narrow end 18 adapted to be positioned above the wheel to a wide end 19 located at the bottom of the skirt, as shown in Figs. 2 and 6. An inwardly curved flange 21 on the inner edge 22 of the guard provides a groove 23 for receiving the inner edge of the fender and skirt. The latter may be formed with an edge reinforcing flange 25, or a bead or other type of finished edge. The edge of the fender is secured in the groove 23 of the guard by any suitable means, such as fastening bolts 26 illustrated by way of example as extending through openings 30 in the two members and secured by nuts 27.

The tapered body portion 16 provides a body portion which projects outwardly beyond the plane of the fender to an extent which gradually increases from the top 18, where little protection is required, to the lower end 19 where there is maximum protection, so that a shield is provided between the wheel 15 and the fender skirt, as shown in Figs. 3 to 6. In the specific embodiment illustrated and as best shown in Fig. 1, the degree of taper and the shape of the inner edge 22 is such as to just compensate for the inward displacement or curve of the lower portion of the fender skirt, so that the outer edge of the guard lies substantially parallel with the longitudinal plane of the main body of the fender and is substantially coplanar therewith.

As a result the outer edge of the guard lies inward a short distance of the plane defined by the ends 28 of the vehicle bumpers and is protected thereby. The outer edge of the guard is finished in any desired manner, as by the inwardly curved flange 29 shown in Figs. 2 to 5 and 9, which adds strength and stiffness and improves the appearance by providing greater thickness to this outer edge.

If desired, the present invention can be an integral part of the vehicle fender, but as herein disclosed it comprises an attachment which can be easily and permanently mounted in place on a fender. When so mounted it provides an effective guard protecting the polished body surface against soiling or marring by stones, mud or the like splashed or thrown by the adjacent wheel. The guard also forms an ornamental addition to the front assembly of a vehicle, and when finished with a chrome or similar surface blends in design with the chrome trim now conventional on this part of a vehicle.

It will be apparent that the invention can be variously modified and adapted within the scope of the appended claims.

Having thus set forth the nature of my invention, I claim:

1. A splash guard for a fender having a skirt located adjacent a vehicle wheel housed beneath the fender, comprising a body member supported along the front edge of the skirt at the rear side of the front wheel to extend transversely thereto and of sufficient width to project one edge outwardly a substantial distance beyond the skirt to guard the outer surface thereof against splash from the vehicle wheel.

2. A splash guard for a fender having a skirt located adjacent a vehicle wheel housed beneath the fender, comprising a tapered body member supported along the front edge of the skirt at the rear of the front wheel to extend transversely thereto with the edge of greatest width at the bottom of the skirt, whereby to project one edge of said member outwardly beyond the plane of the fender to guard the outer surface thereof against splash from the vehicle wheel.

3. A splash guard for a fender having a skirt formed with a lower portion displaced inwardly and located adjacent a vehicle wheel housed beneath the fender, comprising a tapered body member having one edge conforming to the shape of the front edge of the skirt and secured along the edge thereof at the rear of the front wheel opening, said body member being of sufficient width to project the opposite edge outwardly beyond the plane of the displaced lower fender portion to guard the outer surface thereof against splash from the vehicle wheel.

4. A splash guard for the fender of a motor vehicle comprising a tapered body member having a narrow end adapted to be secured to a fender edge above an adjacent wheel, and having an increasing width along the rest of the body to project one edge outwardly a substantial distance beyond the face of a fender at the rear edge of the front wheel opening to guard said face against splash from the vehicle wheel, and means on the opposite edge to secure the same to the edge of the fender.

5. A splash guard for a vehicle fender having a skirt formed with an inwardly displaced lower portion adjacent a vehicle wheel, comprising a body member of varying width so tapered from a relatively narrow end adapted to be secured to the edge of a fender above said wheel at the rear edge of the front wheel opening to a relatively wide end as to project outwardly beyond said inwardly displaced lower portion a sufficient distance to locate the projecting edge of the body member substantially in the vertical plane of the fender surface above the displaced lower portion, whereby to guard the surface of said inwardly displaced portion against splash from said wheel.

6. A splash guard for a vehicle fender having a skirt formed with an inwardly displaced lower portion adjacent a vehicle wheel, comprising a body member of varying width so tapered from a relatively narrow end adapted to be secured to the edge of a fender at the rear of the front wheel opening above said wheel to a relatively wide end as to project outwardly beyond said inwardly displaced lower portion a sufficient distance to locate the projecting edge of the body member substantially in the vertical plane of the fender surface above the displaced lower portion, whereby to guard the surface of said inwardly displaced portion against splash from said wheel, said body member being curved to conform in shape to the shape of the fender edge around the wheel, and means for mounting the guard on said fender edge so that said body member is transverse to the plane of the fender skirt.

WILLIAM G. BRATZ.

REFERENCES CITED

The following references are of record in the file of this patent:

UNITED STATES PATENTS

| Number | Name | Date |
|---|---|---|
| 1,825,344 | Fageol | Sept. 29, 1931 |
| 1,862,388 | Ornberg | June 7, 1932 |